Patented June 10, 1941

2,245,414

UNITED STATES PATENT OFFICE 2,245,414

FLUORESCENT MATERIAL

Willard A. Roberts, Cleveland, Ohio, assignor to General Electric Company, a corporation of New York No Drawing. Application March 14, 1940, Serial No. 323,949

3 Claims. (Cl. 250—81)

My invention relates generally to fluorescent materials and more particularly to novel compositions of fluorescent materials particularly useful in gaseous electric discharge lamps, especially low pressure mercury lamps. Still more particularly, my invention relates to novel compositions of fluorescent materials of the zinc beryllium silicate type. The present application is a continuation-in-part of my application Serial No. 171,953, filed October 30, 1937.

It has been known heretofore that zinc beryllium silicate possessed many desirable properties as a fluorescent material. Such a material, activated with manganese, is disclosed in Patent 2,118,091 to H. W. Leverenz, particularly for use in cathode ray tubes. Patent 2,103,085 to A. H. McKeag et al. discloses the use of such a material in combination with a gaseous electric discharge lamp. In both patents it is stated that the proportions of zinc and beryllium may be widely varied. However, it is also stated that the composition is formed by replacing part of the zinc in zinc orthosilicate ($2ZnO.SiO_2$) by beryllium. In other words the molar sum of the beryllium and zinc is always equal to 2 for each molal of silicon so that the material may be properly termed an orthosilicate of zinc and beryllium.

In accordance with the present invention, I have discovered that advantages in efficiency and color of the light emitted by a fluorescent zinc beryllium silicate are obtained by departing from the proportions found in the orthosilicate. Thus, I have found it desirable to employ a substantially larger amount of silica than is present in the orthosilicate and also a higher amount of manganese activator than used heretofore.

In the new composition comprising my invention, I prefer to maintain the proportions, by weight, of about 60 parts zinc oxide and 40 parts silica with the beryllium oxide content ranging from about 1 to 10 parts and the manganese dioxide content from about 2 to 10 parts. Increasing the amounts of either beryllium or manganese causes an increase in the amount of red light emitted by the material. However, I have found that increasing the amount of beryllium causes a decrease in efficiency so that I prefer to keep down the amount of beryllium and increase the amount of manganese. The ratio between the beryllium and manganese is therefore an important factor in obtaining correct color and brightness.

A particularly useful composition emitting a reddish yellow illumination when excited by 2537Å. radiation may be prepared by mixing thoroughly 200 grams of silica, 300 grams of zinc oxide (or equivalent amount of zinc nitrate), 26 grams of manganous carbonate (or equivalent amount of manganous nitrate) and 20 grams of beryllium oxide. The mixture may be ground to pass a 100 mesh silk bolting cloth. It may then be heated at about 1140° C. for one hour and then ground. The heating and grinding may be repeated until the proper color is obtained when the material is excited by a source of 2537Å. radiation. The material may then be ground to pass a 200 mesh silk bolting cloth. It may then be applied to the interior surface of the envelope of a discharge lamp by methods now well known in the art, preferably by suspending the material in a suitable volatilizable binder and flushing the envelope with the suspension, as disclosed, for example, in Patent 2,179,288, T. W. Frech.

The material described above thus consists of about 60 parts ZnO, 40 parts $SiO_2$, 4 parts BeO and 4 parts $MnO_2$.

An efficient and relatively inexpensive red fluorescent zinc beryllium silicate may be prepared by heating a mixture of 60 parts zinc oxide, 40 parts silica, 10 parts manganous carbonate and 6 parts beryllium oxide to a temperature of about 1100° C. to 1150° C. for from one to two hours. This material differs from that described above in that the proportions of both the beryllium and the manganese have been increased so that the finished material consists of about 60 parts ZnO, 40 parts $SiO_2$, 6 parts BeO and 7½ parts $MnO_2$. The material may be used as a substitute for the more expensive cadmium borate in some of the mixtures of phosphors employed to produce white fluorescent lamps.

If desired, a small amount, say about ½ part by weight, of lithium chloride may be mixed with the starting materials as a flux. Also, the silica may be introduced as silicic acid, and the beryllium oxide as beryllium hydroxide. Also, if desired, the material may be quenched in water after the final heat treatment, and the firing temperature may be varied somewhat to produce different shades of color.

The material comprising my invention is preferably coated on the interior surface of the glass envelope of a gaseous electric discharge lamp, for instance a lamp of the type shown in Patent 2,182,732, F. Meyer et al. Preferably, the lamp contains a filling of a rare gas such as argon at at pressure of about 4 mm. and a small quantity of mercury and is operated with a mercury vapor pressure of the order of 12 microns so as to produce an abundance of radiations of 2537Å. wavelength.

The reddish yellow fluorescent material described above is particularly suitable for mixing with other phosphors to produce a white light. For example, it may be mixed with magnesium tungstate to produce a white light, or with magnesium tungstate and cadmium borate to produce a daylight lamp, as described in application Serial No. 236,277, George E. Inman, filed October 21, 1938. The said reddish yellow material may also be coated on the interior of a low pressure mercury discharge device to produce a gold or yellow lamp in which case a coating of yellow-colored material is preferably also applied to screen out the light other than the yellow light. The said yellow-colored coating is preferably applied to the inner surface of the envelope before the coating of fluorescent material is applied thereto.

What I claim as new and desire to secure by Letters Patent of the United States is:

1. A fluorescent zinc beryllium silicate for gaseous electric discharge lamps containing a source of ultraviolet radiation comprising by weight approximately 60 parts zinc oxide, 40 parts silica, 1 to 10 parts beryllium oxide and 2 to 10 parts manganese dioxide.

2. A fluorescent zinc beryllium silicate for gaseous electric discharge lamps containing a source of ultraviolet radiation comprising by weight approximately 60 parts zinc oxide, 40 parts silica, 4 parts beryllium oxide and 4 parts manganese dioxide.

3. A fluorescent zinc beryllium silicate for gaseous electric discharge lamps containing a source of ultraviolet radiation comprising by weight approximately 60 parts zinc oxide, 40 parts silica, 6 parts beryllium oxide and 7½ parts manganese dioxide.

WILLARD A. ROBERTS.